United States Patent
Duguet et al.

(10) Patent No.: US 7,192,252 B2
(45) Date of Patent: Mar. 20, 2007

(54) SAFETY DEVICE FOR A WIND TURBINE

(75) Inventors: Olivier Duguet, Maisons Laffitte (FR); Jean-Marc Jailloux, Sannois (FR)

(73) Assignee: Societe Francaise des Alizes, Laffitte (FR)

( * ) Notice: Subject to any disclaimer, the term of this patent is extended or adjusted under 35 U.S.C. 154(b) by 111 days.

(21) Appl. No.: 10/966,351

(22) Filed: Oct. 15, 2004

(65) Prior Publication Data
US 2005/0095130 A1    May 5, 2005

(30) Foreign Application Priority Data
Oct. 17, 2003    (FR) .................................. 03 12184

(51) Int. Cl.
*F03D 11/04*    (2006.01)
(52) U.S. Cl. .................. 416/142; 416/246; 416/DIG. 6
(58) Field of Classification Search ................ 416/142, 416/146 R, 244 R, 244 A, 246, DIG. 6
See application file for complete search history.

(56) References Cited

FOREIGN PATENT DOCUMENTS

| | | | |
|---|---|---|---|
| DE | 28 06 081 A1 | 8/1979 | |
| DE | 199 31 713 A1 | 1/2001 | |
| EP | 1 316 656 A1 | 6/2003 | |
| FR | 2 446 930 | 8/1980 | |
| FR | 2 823 784 A | 10/2002 | |
| JP | 61-275587 A | * 12/1986 | ................. 416/142 |
| JP | 62282178 A | 12/1987 | |

OTHER PUBLICATIONS

Corresponding French application Search Report, dated Jun. 14, 2004.

* cited by examiner

*Primary Examiner*—Christopher Verdier
(74) *Attorney, Agent, or Firm*—Christie, Parker & Hale, LLP

(57) ABSTRACT

The mast (2) of the wind turbine is formed by at least two segments (13, 15) articulated to one another so as to pivot between a straightened position and a folded position. The pivoting of the two segments (13, 15) is coordinated in such a way that they always form the same angle ($a_1$) with the vertical, making it possible to maintain the centre of gravity of the wind turbine in vertical alignment with the lower segment (11). Consequently the wind turbine can be folded down in the case of high winds under optimum safety conditions and with reduced space occupied.

9 Claims, 2 Drawing Sheets

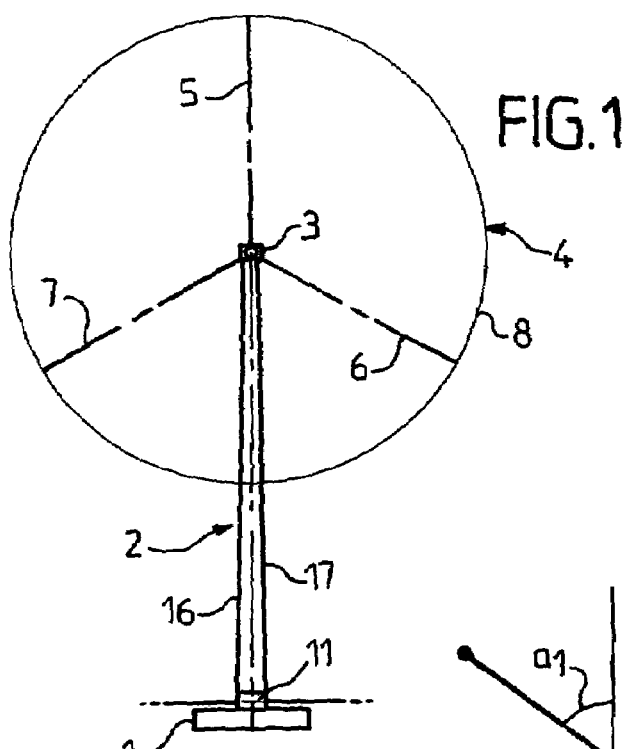
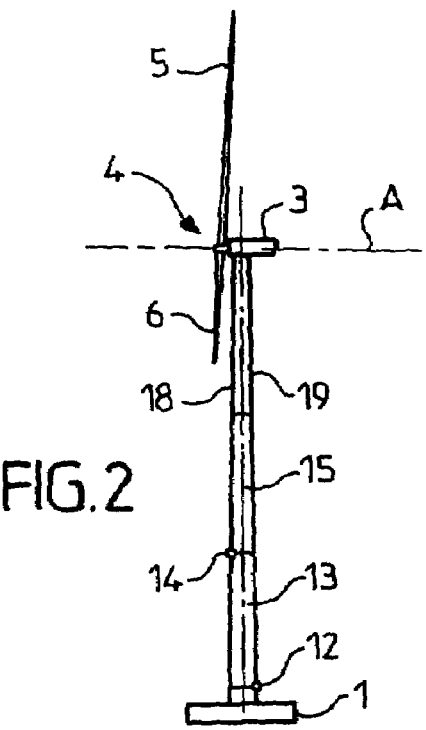
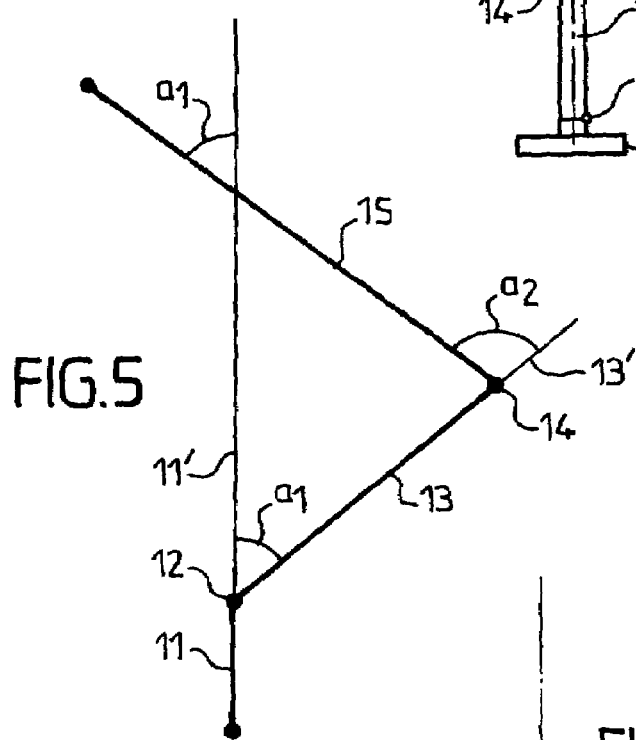
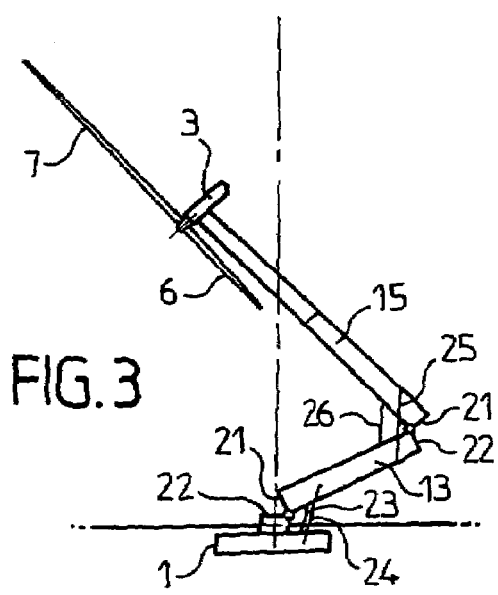
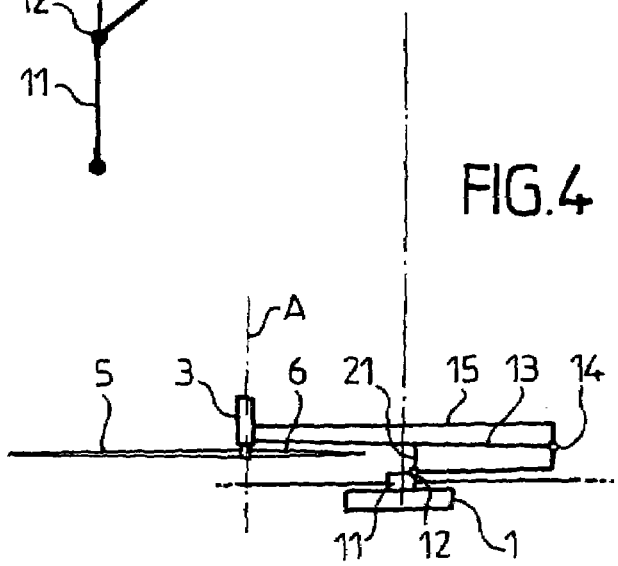

SAFETY DEVICE FOR A WIND TURBINE

CROSS-REFERENCE TO RELATED APPLICATION

This application claims priority to French Patent Application No. 0312184, filed on Oct. 17, 2003.

The invention relates to a wind turbine comprising a mast articulated in such a way as to assume a straightened position in which it extends substantially vertically above a foundation anchored to the ground and a folded position close to the ground, and a rotor provided with blades fitted in the vicinity of the top of the mast so as to rotate about a substantially horizontal axis when the mast is in the straightened position.

JP 62282178 A and FR 2 823 784 A describe wind turbines, whereof the mast has a single joint or articulation close to the ground making it possible to fold the mast down to ground level in the case of a very strong wind. The devices described comprise an auxiliary mast and a system of cables linking the two masts, whose handling is dangerous in high winds. Moreover, the devices described involve a significant ground space occupied, particularly when the articulated mast is folded down.

The object of the invention is to make it possible to fold the mast of a wind turbine in such a way that the latter is not damaged in high winds, avoiding the disadvantages of the prior art.

The invention is more particularly directed at a wind turbine of the type defined hereinbefore and according to which the mast comprises at least two mobile segments articulated about substantially horizontal axes which are parallel to one another, so as to pivot in a given direction from the straightened position, said pivoting direction being reversed between successive joints, means being provided for coordinating the pivoting of the different segments so that the centre of gravity of the wind turbine remains substantially above the foundation.

The invention requires no element significantly increasing its surface area on the ground when the mast is straightened. When the mast is folded, its configuration with at least two mobile segments significantly reduces the space occupied on the ground by the wind turbine. The maintaining of the centre of gravity of the wind turbine above the foundation on which it rests ensures the stability of the wind turbine during folding up and down operations.

Optional features of the invention, which are complementary or alternative, are listed hereinafter:

The pivoting of the mobile segments is coordinated in such a way that they form with the vertical respective angles $a_1$ equal in absolute value and the position of the joints is determined by the distribution of the weights of the articulated support so as to maintain the centre of gravity in registration with the foundation.

The mast also comprises a lower, fixed segment which is substantially vertical and on which is articulated one of the mobile segments.

The means for coordinating the pivoting of the segments comprise hydraulic jacks, each controlling the mutual pivoting angle of two consecutive segments.

The pivoting of a mobile segment is controlled by two hydraulic jacks positioned substantially symmetrically to each other with respect to the plane in which move the longitudinal axes of the segments.

The hydraulic jacks operate substantially in the vertical direction.

The mobile segments extend substantially horizontally in the folded position.

In the folded position, the blades are located above the upper segment.

In the folded position, the blades are located below the upper segment, the rotor being positioned so as not to impede the pivoting of the segments.

Means are provided for immobilizing the rotor in rotation in the folded position and during the pivoting of the segments, in an orientation such that in the folded position of the segments at least one intermediate segment is located in the angle formed by two consecutive blades.

The features and advantages of the invention are described in greater detail hereinafter with reference to the attached drawings.

FIGS. 1 and 2 are elevation, respectively front and side views of a wind turbine according to the invention, whose mast is in the straightened position.

FIGS. 3 and 4 are views similar to FIG. 2 showing the mast in an intermediate position and in the folded position respectively.

FIG. 5 is a diagram illustrating the pivoting angles of the mast segments.

Figure 6:
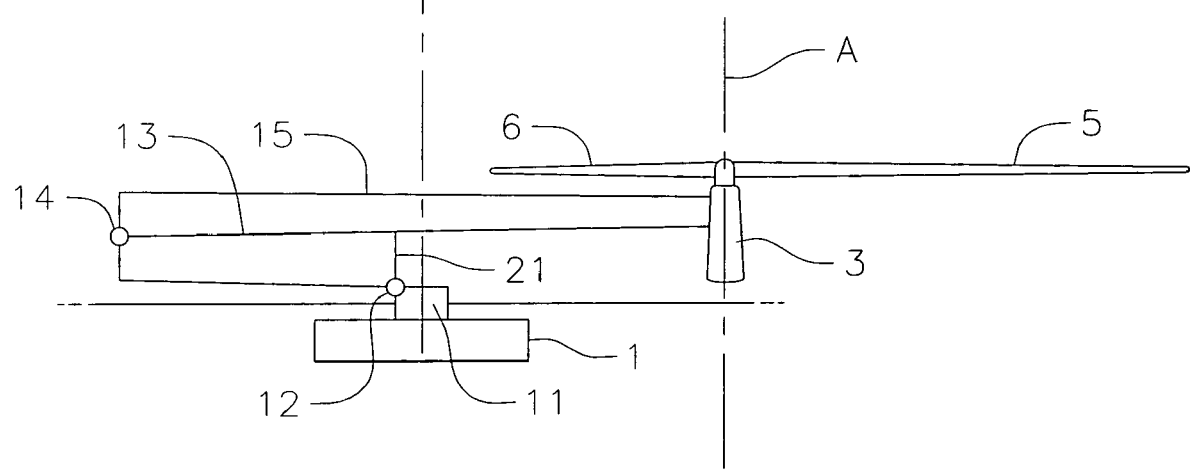
FIG. 6 is a side view of the wind turbine of the present invention showing the mast in an alternative folded position.

The wind turbine shown conventionally comprises a reinforced concrete foundation or base 1 having horizontal dimensions of a few metres and which is intended to be anchored to the ground, a mast 2 which, in the state shown in FIGS. 1 and 2 rises vertically from the base 1, a support or platform 3 installed at the top of the mast and which supports a rotor 4 able to rotate about an approximately horizontal axis A. The rotor comprises three blades 5, 6, 7, which are diagrammatically represented in FIG. 1 by radial uneven dashed lines and by a circle 8 constituting the locus of the ends of the blades during the rotation of the rotor. The rotor can also turn in the manner of a weathervane about the vertical axis of the mast.

According to the invention the mast 2 is formed from three segments mutually articulated about substantially horizontal axes which are substantially parallel to one another. A first fixed segment 11 integral with the base 1 and very short in the embodiment of FIGS. 1 to 4 is articulated about an axis 12 to a second segment 13, itself articulated about an axis 14 to a third segment 15 carrying the platform 3. The mast 2 is generally shaped like a truncated cone, whose generatrix is very slightly inclined with respect to the vertical.

The pivot axes 12 and 14 are substantially tangential to the mast on either side of the latter. This enables the segments 13 and 15 to respectively pivot to the right and left with respect to their vertical orientation, as can be seen in FIG. 3, the initially horizontal, lower face 21 of each of them forming an ever more open angle with the upper face 22 of the underlying segment. In the illustrated embodiment, this pivoting movement is controlled by hydraulic jacks, namely two jacks 23, 24 acting between the base 1 and the segment 13 and two jacks 25, 26 acting between the segments 13 and 15. This pivoting can continue up to the position shown in FIG. 4, where the segments 13 and 15 extend substantially horizontally for a minimum wind resistance. In the embodiment shown, the blades are then located below the segment 15 and are substantially level with the segment 13. The free distance between the axis A of the rotor and the lower face 21 of the segment 13 being smaller than the radius of the blades, the rotor is immobilized during the folding operation and in the folded state, so that the blades 6 and 7 are positioned substantially symmetrically on either side of the plane containing the longitudinal axes of the segments, blade 5 being rotated opposite to the segment 13. Thus, any contact between the blades and segments of the mast is avoided during the folding in and out operations and in the folded state. Obviously the weathervane movement of the rotor is also blocked in order to maintain the axis A perpendicular to axes 12 and 14.

FIG. 6 illustrates an alternative wind turbine folded position similar to FIG. 4 wherein the axes 12 and 14 are positioned on opposite sides of the mast such that the segments 13 and 15 extend substantially horizontally and the blades are located above segment 15.

Jacks 23 to 26 are controlled synchronously so as to permanently respect a given relationship between the angles $a_1$ and $a_2$ indicated In FIG. 5, the angle $a_1$ being the pivoting angle of the joint 12, i.e. the angle between the segment 13 and the upward extension 11' of segment 11, and the angle $a_2$ being the pivoting angle of the joint 14, i.e. the angle between the segment 15 and the upward extension 13' of segment 13. Angle $a_2$ must be equal to twice the angle $a_1$, so that the segments 13 and 15 are inclined by the same angle $a_1$ relative to the vertical. The respective heights of the segments 13 and 15 are chosen, bearing in mind the weight of the platform and the rotor, in such a way that the centre of gravity of the mobile assembly and consequently the entire wind turbine is substantially in the vertical alignment of the fixed segment 11 and above the base 1. Due to the aforementioned angular relationship, the centre of gravity of the mobile assembly moves on a vertical line, so that its positioning in the manner defined hereinbefore is retained throughout the folding up and down operations. Thus, folding can take place with complete safety even in a high wind.

The wind turbine described hereinbefore can more particularly be obtained by modifying a commercially available, one-piece mast wind turbine. For this purpose sectioning of the mast takes place at the desired locations. Each joint is formed by two half-collars respectively fixed to the segments in question for the purpose of receiving a shaft. These half-collars reinforce the ends of mast sections at the location of their division. The joints are preferably locked in the straightened position when the wind turbine is operating using remotely controlled mechanical means such as screw-nut systems or keys. The unlocking and locking controls for the joints can e.g. be ensured by jacks or hydraulic or electric motors.

Besides its safety function in the case of a very strong wind, the invention facilitates the installation of the wind turbine, the putting into place of the platform and the rotor on the mast being performable when the latter is in the folded state.

The fixed segment of the mast shown very short in FIGS. 1 to 4 and longer in FIG. 5 can be completely eliminated, the first pivot axis being installed directly on the foundation.

Although in no way being limited thereto, the invention particularly applies to wind turbines having a mast with a weight of approximately 40 tonnes and a height of more than 45 metres and supporting elements (platform, rotor) weighing approximately 20 to 50 tonnes. The rotor diameter is approximately 50 metres. The wind turbine is able to withstand winds of approximately 150 km/h level with the axis of the rotor in the straightened position, 60 to 70 km/h during the folding operation and approximately 300 km/h in the folded position. The vertical, fixed segment, when present, can have a height of 3 to 5 metres so as to accommodate the instrumentation generally located at the base of existing wind turbines.

Modifications can be made to the embodiments described and shown without departing from the scope of the invention. Thus, each of the jack pairs 23, 24 and 25, 26 can be replaced by a single jack. The pivoting of the mast segments can be controlled by means other than hydraulic jacks, e.g. screw-nut systems operated by electric or hydraulic motors. Synchronism between the two joints can be brought about by chain and sprocket wheel systems. The mast can have more than two joints, the mobile segments being arranged in zig-zag manner during folding and all forming the same angle $a_1$ in absolute value with the vertical. The rotor blades can be turned upwards with respect to the last segment of the mast in the folded position and in this case blades can have any orientation about the rotor axis.

The invention claimed is:

1. Wind turbine comprising a mast (2) articulated so as to take a straightened position in which the mast extends substantially vertically above a foundation anchored to the ground and a folded position close to the ground, and a rotor (4) equipped with blades (5 to 7) installed in a vicinity of a top of the mast so as to rotate about a substantially horizontal axis (A) when the mast is in the straightened position, characterized in that the mast comprises at least two mobile segments (13, 15) articulated about axes (12, 14) which are substantially horizontal and parallel to one another, so as to pivot in a given direction from the straightened position, said pivoting direction being reversed between successive articulations, the mobile segments (13,15) extending substantially horizontally in the folded position, and in that means (23 to 26) are provided for coordinating the pivoting of the different segments in such a way that the centre of gravity of the wind turbine remains substantially in vertical alignment with the foundation.

2. Wind turbine according to claim 1, wherein the pivoting of the mobile segments is coordinated in such a way that they form with the vertical respective angles ($a_1$) which are equal in absolute value and the position of the articulations is determined by the weight distribution of the articulated mast so as to maintain the centre of gravity in vertical alignment with the foundation.

3. Wind turbine according to claim 1 or 2, wherein the mast also comprises a substantially vertical, lower, fixed segment (11) to which is articulated one (13) of the mobile segments.

4. Wind turbine according to claim 1, wherein the means for coordinating the pivoting of the segments comprise hydraulic jacks (23 to 26), each controlling the mutual pivoting angle of two consecutive segments.

5. Wind turbine according to claim 4, wherein the pivoting of a mobile segment (13) is controlled by two hydraulic jacks (25, 26) positioned substantially symmetrically to each other with respect to the plane in which run the longitudinal axes of the segments.

6. Wind turbine according to claim 4 or 5, wherein the hydraulic jacks (25, 26) operate substantially in the vertical direction.

7. Wind turbine according to claim 1, wherein the blades (5, 6, 7) are located above the upper segment in the folded position.

8. Wind turbine according to claim 1, wherein the blades are located below the upper segment, the rotor being positioned so as not to impede the pivoting of the segments, in the folded position.

9. Wind turbine according to claim 8, wherein means are provided for immobilizing the rotor in rotation, in the folded position and during the pivoting of the segments, in an orientation such that in the folded position of the segments at least one intermediate segment (13) is positioned in the angle formed by two consecutive blades (6, 7).

* * * * *

UNITED STATES PATENT AND TRADEMARK OFFICE
CERTIFICATE OF CORRECTION

PATENT NO. : 7,192,252 B2  Page 1 of 1
APPLICATION NO. : 10/966351
DATED : March 20, 2007
INVENTOR(S) : Duguet et al.

It is certified that error appears in the above-identified patent and that said Letters Patent is hereby corrected as shown below:

In the Claims

Column 5, line 1, Claim 9        Delete "claim 8",
                                 Insert --claim 7--

Signed and Sealed this

Eleventh Day of March, 2008

JON W. DUDAS
*Director of the United States Patent and Trademark Office*